(12) United States Patent
Engel et al.

(10) Patent No.: US 12,169,531 B2
(45) Date of Patent: Dec. 17, 2024

(54) OPTIMIZING REQUEST SIZES IN A SEARCH ENGINE FANOUT

(71) Applicant: Microsoft Technology Licensing, LLC, Redmond, WA (US)

(72) Inventors: Harrison Donald Engel, El Paso, TX (US); Sankalp Navneet Bihani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 17/586,240

(22) Filed: Jan. 27, 2022

(65) Prior Publication Data
US 2023/0237107 A1   Jul. 27, 2023

(51) Int. Cl.
*G06F 16/953*   (2019.01)
*G06F 16/2457*  (2019.01)

(52) U.S. Cl.
CPC ...... *G06F 16/953* (2019.01); *G06F 16/24578* (2019.01)

(58) Field of Classification Search
CPC .. G06F 16/953; G06F 16/9538; G06F 16/951; G06F 16/24578
See application file for complete search history.

(56) References Cited

U.S. PATENT DOCUMENTS

| | | | |
|---|---|---|---|
| 7,702,614 B1* | 4/2010 | Shah | G06F 16/319 707/739 |
| 2012/0047164 A1* | 2/2012 | Saadat | G06F 16/134 707/769 |
| 2012/0143873 A1* | 6/2012 | Saadat | G06F 16/278 707/741 |
| 2015/0254303 A1* | 9/2015 | Saadat | G06F 16/2228 707/716 |
| 2015/0261817 A1* | 9/2015 | Harris | G06F 16/24542 707/718 |
| 2018/0232424 A1 | 8/2018 | Raghunathan et al. | |
| 2018/0336278 A1* | 11/2018 | Agarwal | G06F 16/35 |
| 2019/0095483 A1* | 3/2019 | Shimamura | G06F 17/18 |
| 2020/0065344 A1* | 2/2020 | Bobick | G06F 16/24578 |
| 2020/0349205 A1 | 11/2020 | Busch et al. | |
| 2021/0097591 A1* | 4/2021 | Abeer | G06F 16/9538 |

OTHER PUBLICATIONS

"International Search Report and Written Opinion Issued in PCT Application No. PCT/US22/048120", Mailed Date: Jan. 30, 2023, 12 Pages.

* cited by examiner

*Primary Examiner* — Hau H Hoang
(74) *Attorney, Agent, or Firm* — RAY QUINNEY & NEBEKER P.C.; Paul N. Taylor

(57) ABSTRACT

The present disclosure relates to systems and methods for implementing a distributed search that allows a search engine to retrieve the correct results for a search request even if the search engine does not request the full results from each index shard originally requested in the search request.

19 Claims, 6 Drawing Sheets

Top 10 Results: | $R_{1,1}$ | $R_{1,2}$ | $R_{1,8}$ | $R_{2,1}$ | $R_{1,100}$ | $R_{1,750}$ | $R_{1,900}$ | $R_{3,1}$ | $R_{1,350}$ | $R_{1,80}$ |

Top 10 Results: | $R_{1,1}$ | $R_{2,1}$ | $R_{3,1}$ | $R_{4,1}$ | $R_{5,1}$ | $R_{6,1}$ | $R_{7,1}$ | $R_{8,1}$ | $R_{9,1}$ | $R_{10,1}$ |

Top 10 Results: | $R_{1,1}$ | $R_{1,2}$ | $R_{1,8}$ | $R_{99,1}$ | $R_{1,100}$ | $R_{1,750}$ | $R_{1,900}$ | $R_{19,1}$ | $R_{1,350}$ | $R_{1,80}$ |

Top 2 Results: | $R_{1,1}$ | $R_{2,1}$ | ~ 502

Top 10 Results: | $R_{1,1}$ | $R_{1,2}$ | $R_{1,8}$ | $R_{2,1}$ | $R_{1,100}$ | $R_{1,750}$ | $R_{1,900}$ | $R_{1,350}$ | $R_{1,80}$ | $R_{1,23}$ 506 ↑ (above $R_{2,1}$)

Top 10 Results: | $R_{1,1}$ | $R_{1,2}$ | $R_{1,8}$ | $R_{2,1}$ | $R_{1,100}$ | $R_{1,750}$ | $R_{1,900}$ | $R_{3,1}$ | $R_{1,350}$ | $R_{1,80}$

OPTIMIZING REQUEST SIZES IN A SEARCH ENGINE FANOUT

BACKGROUND

In distributed search engines (and other information retrieval systems), the caller usually wants to get the top n results by some rule (model rank or item property value). To handle this, search engines request the top n results from each distributed shard and merges the top results to get the overall top results. The number of results processed in the system is potentially n*the number of shards. This number can get prohibitively large for large page sizes or large numbers of shards. As search systems get larger, the number of shards involved can cause us to need to merge hundreds of thousands of results to serve even small requests.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method may include receiving a search request with a search size. The method may include sending a shard request to a plurality of index shards with a size request for an amount of search results, wherein the size request is less than the search size. The method may include receiving the search results from the plurality of index shards.

Some implementations relate to a method. The method may include receiving a search request with a search size for an amount of search results. The method may include determining a probability threshold. The method may include determining a size request for a shard request based on the probability threshold, wherein the size request is less than the search size. The method may include sending the shard request to a plurality of index shards with the size request. The method may include receiving search results from the plurality of index shards.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIGS. 3A-3C illustrate example of search results returned by a current system using a search engine that performs a fan out algorithm for a distributed search.

FIGS. 5A-5C illustrate example search results returned by a search engine in accordance with implementations of the present disclosure.

DETAILED DESCRIPTION

This disclosure generally relates to distributed searches. In distributed search engines (and other information retrieval systems), the caller usually wants to get the top n results (where n is a positive integer) by some rule (model rank or item property value). To handle this, search engines request the top n results from each distributed shard and merges the top results to get the overall top results. As search systems get larger, the number of shards involved can increase, resulting in the need to merge hundreds of thousands of results to serve even small requests.

Figure 1:
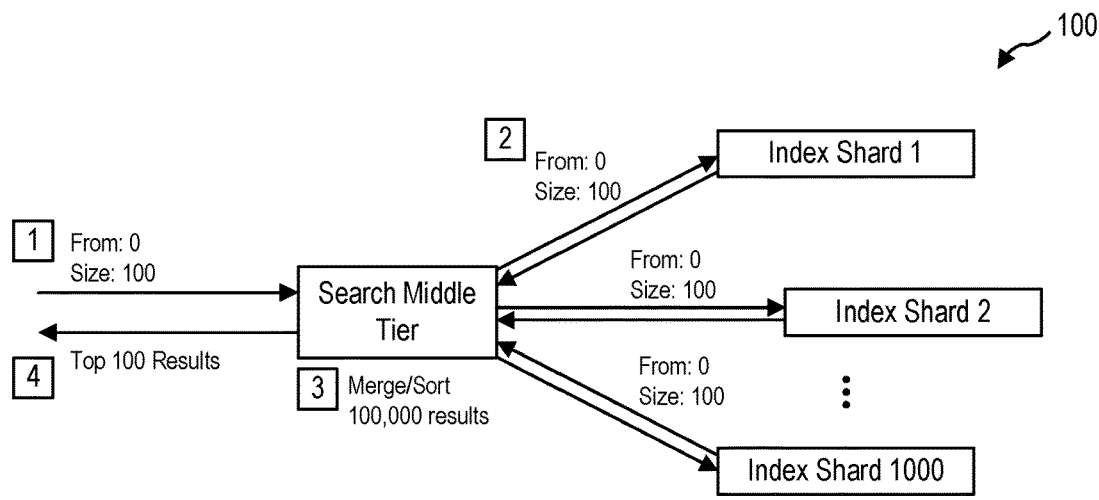
FIG. 1 illustrates an example of a current system that includes a search engine that performs a distributed search.

Referring now to FIG. 1, illustrated is a current system 100 that includes a search engine that performs a distributed search. The search engine typically powers different experiences for users of the system 100. For example, the search engine searches across e-mails, messages, files, documents, etc. The core physical indexes that power the search engine are typically kept relatively small given the massive scale of the service, somewhere around 1 million items per index.

Since these physical indexes perform best at a small size and some tenants need massive logical indexes (some measured in the billions of documents), the system 100 is used for querying large, distributed indexes in the substrate. The distributed indexes can be huge, in some cases as large as 8,000 index nodes. The search engine of the system 100 uses a current fan algorithm to query these potentially massive indexes.

In the system 100, the documents are distributes across these indexes by using a uniform hash distribution based on a system-assigned unique id making it unlikely any one index shard has strongly correlated results. As such, hotspots are prevented on ingestion.

An example of the current fanout algorithm used by the search engine includes querying 1,000 shards. At 1, the current fanout algorithm includes receiving a request that asks to serve the top 100 results from each index shard. At 2, the search middle tier sends a request to each index shard for the top 100 results. At 3, the results from each index shard are merged and/or sorted to get the top 100 results. At 4, the top 100 results are returned to the caller (e.g., the application that requested the top 100 results).

In the system 100 potentially 100,000 results need to be sent across the network, deserialized, represented in memory, and merged, to get the top 100 results.

An example maximum page size for the system 100 is 1,000 with page sizes of 200 to 500 being common. Moreover, many tenants have 1,000 shard indexes, with outlier tenants needing 8,000 shard indexes to support some of their hardest queries. This means result counts of 500,000 are common, and over 8,000,000 possible result counts, just to serve first-page queries. As such, a problem exists in the system 100 as increasing the shard linearly increases the number of results that need to process to serve a client.

Figure 2:
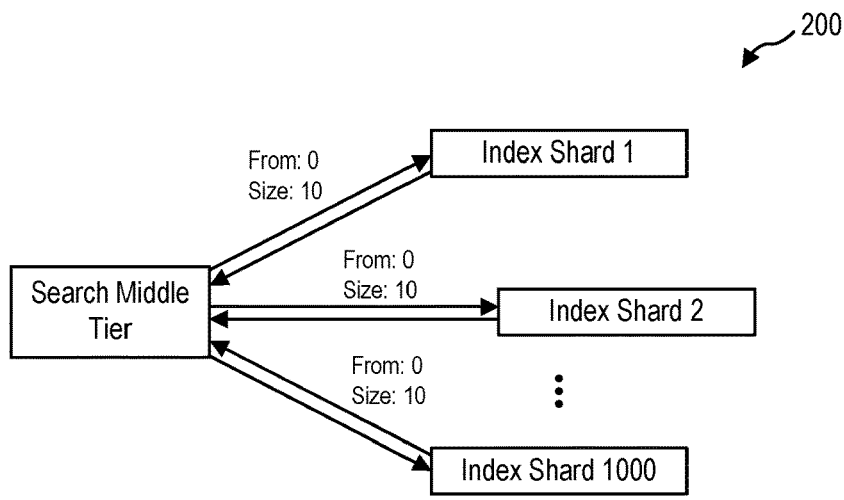
FIG. 2 illustrates an example of a current search engine that performs a current fan out algorithm for a distributed search.

Referring now to FIG. 2, illustrated is an example of a current search engine 200 that performs a current fan out algorithm for a distributed search. The search engine 200 receives a request for the top 10 results on a tenant that has 1,000 index shards. The search middle tier sends a request to each index shard for the top 10 results. The results from each index shard are merged and/or sorted to get the overall top 10 results. As such, in the current fan out algorithm, each index shard receives a request for 10 results (the size of the request received), the received search results from each index shard are merged, and the overall top 10 search results are returned. For example, the top 10 search results are placed in an order from 1 to 10 based on a ranking of the search results.

Referring now to FIGS. 3A-3C, illustrated are example of search results returned by the search engine 200 (FIG. 2) performing a current fan out algorithm for a distributed search. The results are represented as R{Sequence of Result from Shard},{Shard Number}, where the Sequence of Result from Shard indicates a placement of the search result in the ordered list and the Shard Number indicates the shard that provided the search result. For example, R1,8 is the first result in the search results from the $8^{th}$ index shard.

FIG. 3A illustrates an example search result list 300 provided by the search engine 200. The search result list 300 provides the top 10 results overall. The search results list 300 is provided by a handful of shards, with the Index Shard 1 contributing a disproportional three results to the top 10 results. Most shards did not contribute any results at all, which always is the case since the number of index shards is 1000 and the number of top results is only 10.

FIG. 3B illustrates an example search result list 302 that is provided by the search engine 200. In the search result list 302, every single search result came from the same index shard, Index Shard 1. Having every single search result come from the same index shard is rare, since the results are uniformly-hash-distributed based on their unique identifier that should have no bearing to any kind of query that is issued. However, it is possible, and becomes more likely at smaller index shard counts.

FIG. 3C illustrates another example search result list 304 that is provided by the search engine 200. The search result 304 includes search results that are each from a different index shard. As such, FIG. 3A-3C illustrate different possible index shard distributions among the search results 300, 302, 304 that search engine 200 provides when using the current fan out algorithm.

The current fan out algorithm requests the total size of the search request from each index shard to get the top results to return. The current fan out algorithm requests the total size of the search from each index shard because in theory, as illustrated in FIG. 3B, the top search results may be all on the same index shard, and thus, the current fan out algorithm requests the total size to prevent missing search results.

The present disclosure provides systems and methods that dramatically reduces the number of results needed to process in a search fanout. The systems and methods implement a distributed search algorithm that allows a search engine to retrieve the correct results even if the search engine does not request the full n results from each index shard originally requested in the search request. For example, if the search request requested the top 100 search results, the systems and methods request less than 100 search results from the different index shards.

By requesting less than the original amount of search results requested, a possibility of missing a search result arises. The systems and methods determine whether the received search results are correct. If the search results are correct, the system and methods return the search results received. If the search results are incorrect, the system and methods perform another request to the search index shards for additional search results. The systems and methods makes a tradeoff where in some cases the algorithm needs extra round-trips, adding latency to the overall query but serving correct results. Even with the extra round-trips, the cost with respect to the search middle tier and/or the total items processed (e.g., an increase in latency) is still less than current fanout algorithm solutions.

In some implementations, a mathematical model is used for uniform-hash-distributed shards that closely approximates the odds that certain result size requested from a shard requires a single round-trip. Thus, the number of requests from each shard can be minimized to request only enough results that the probability of requiring a follow-up request is below a threshold (e.g., less than 5% or 1%).

The distributed search algorithm used by the systems and methods of the present disclosure dramatically reduces the number of results needed to process in a search fanout. In some implementations, for 99.99% of queries the distributed search algorithm do not require a round-trip and is pure resource and latency improvement in the distributed search engine, and thus, improving resource use and latency in relation to the number of shards involved, with massive fanouts seeing as much as a 99% decrease in fanout overhead and results processed. In 0.01% of queries, the distributed search algorithm requires an extra round-trip, resulting in a relatively minor increase in latency for the distributed search engine. As such, one technical advantage of some implementations of the present disclosure is improved latencies and reduced costs for the distributed search engine.

Figure 4:
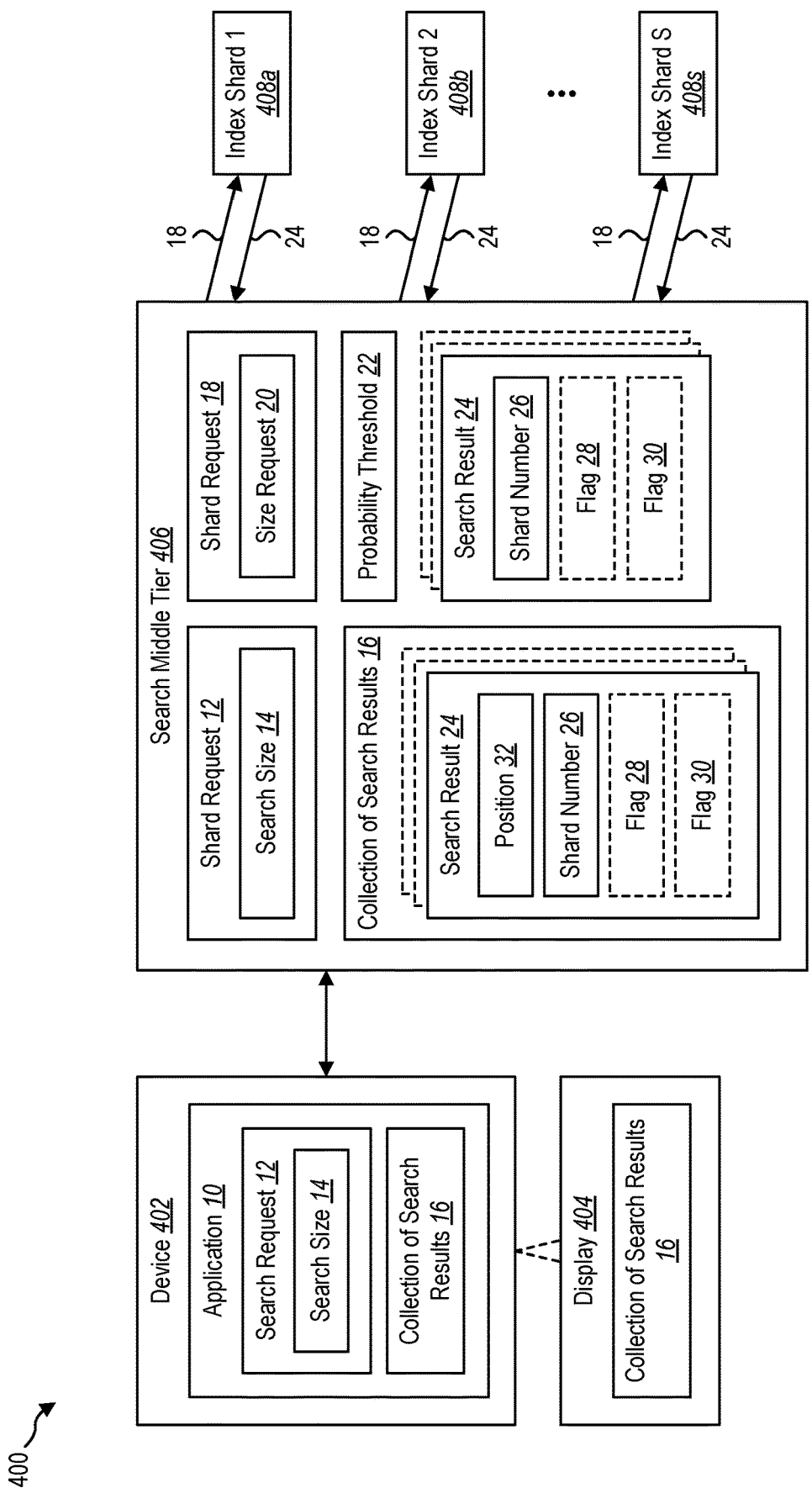
FIG. 4 illustrates an example environment for a search engine that performs a distributed search in accordance with implementations of the present disclosure.

Referring now to FIG. 4, illustrated is an example environment 400 for a search engine to perform a distributed search. The search engine includes a search middle tier 406 in communication with one or more devices 402 and a plurality of index shards 408a, 408b up to 408s (where s is a positive integer). The one or more devices 402 include applications 10 that send search requests 12 to the search engine. Example search requests 12 include searching e-mails (e.g., return the e-mails sent to an individual), searching messages (e.g., return the messages sent on a particular date), searching files (e.g., return the files with a particular word in the file name), searching documents (e.g., provide the documents authored by an individual), etc.

The search requests 12 include a search size 14 that indicates an amount of search results to return to the application 10. In some implementations, the search size 14 is a default number that is the maximum results returned by the search engine. One example search size 14 includes a request for a top one hundred search results. Another example search size 14 includes a request for twenty search results. In some implementations, the search size 14 changes for different search requests 12 and/or for different applications 10.

The search middle tier 406 receives the search request 12 for the search size 14. The search middle tier 406 sends a shard request 18 to each index shard 408 of the plurality of index shards 408a-408s with a size request 20 for an amount of search results 24 from each index shard 408. The size request 20 is less than the search size 14. As such, the search middle tier 406 sends the shard request 18 to each index shard 408 requesting an amount of search results 24 equal to the size request 20.

In some implementations, the content is uniformly or evenly distributed among the plurality of index shards 408a-408s. A uniform hash distribution based on a system-assigned unique id is used to distribute the content uniformly among the plurality of index shards 408a-408s making it unlikely any one index shard 408 has strongly correlated results. In some implementations, the content is non-uniformly or unevenly distributed among the plurality of index shards 408a-408s.

The search middle tier 406 receives the search results 24 from the index shards 408 and the search results 24 include a shard number 26 that identifies the index shard 408 that provided the search results 24. In some implementations, the search results 24 include a flag 28 that the search middle tier 406 uses to identify the last search results 24 seen so far by the search middle tier 406 from the index shard 408 that provided the search result 24. The flag 28 indicates that the search result 24 is the last search result 24 that has been received from the index shard 408 identified by the shared number 26. For example, if the size request 20 is for two search results, the flag 28 is on the second search result 24 received from the shard 408.

In some implementations, the search results 24 include a flag 30 that indicates the search result 24 is the last search result 24 received for the index shard 408. As such, the flag 30 is used by the search middle tier 406 to indicate when the index shard 408 identified by the shard number 26 no longer has any additional search results 24 to provide to the search middle tier 406. For example, if the search request 12 is for documents created on a specific date, the flag 30 indicates that the index shard 408 provided all the documents created on the specific date accessible by the index shard 408 and that the index shard 408 has no additional documents to provide.

The search middle tier 406 merges the search results 24 received from the plurality of shards 408a-408s into a collection of search results 16. The collection of search results 16 equals the search size 14. In some implementations, the collection of search results 16 is an ordered list of the search results 24 where the search results 24 are placed in an order based on a ranking of the search results 24. For example, if the search size 14 is 100, the collection of search results 16 included an ordered list of the top 100 search results 24 returned from the plurality of shards 408a-408s. Each search result 24 includes a position 32 that identifies a placement of the search result 24 in the ordered list. For example, if the search size is 10, each of the search results 24 included in the collection of search results 16 includes a position 32 (e.g., 1-10) indicating the placement of the search result 24 in the order. As such, the collection of search results 24 is a subset of the search results 24 received from the plurality of shards 408a-408s.

In some implementations, the collection of the search results 16 does not include a total ordering of the search results 24. For example, the first 100 search results 24 received from the index shards 408 are placed in the collection of the search results 16.

One example use case includes the search middle tier 406 receiving a search request for a top 100 search results from an application 10 for a query provided by a user of the device 402 (e.g., a search for e-mails received from an individual). The search middle tier 406 is in communication with 1,000 index shards 408 with content (e.g., the e-mails) uniformly distributed amongst all the index shards. The search middle tier 406 sends a shard request 18 with a size request 20 of two search results to each of the index shards 408. The search middle tier 406 receives two search results 24 from any index shard 408 that has an e-mail received from the individual identified in the query. As such, instead of the search middle tier 406 asking for 100 e-mails from each index shard 408, the search middle tier 406 only asks for 2 e-mails from each index shard 408.

The search middle tier 406 merges the received search results 24 into a collection of search results 16, an ordered list to determine the top 100 search results 24 received from the index shards 408. The search middle tier 406 performs a verification to ensure that the collection of search results 16 is correct and that search results 24 are not missing from the collection of search results 16.

In some implementations, the search middle tier 406 determines whether the collection of search results 16 is complete to verify that the collection of search results 16 is correct. The search middle tier 406 uses the flags 28, 30 to determine whether the collection of search results 16 is complete. If the last search result 24 received from the index shard 408 is not included in the collection of search results 16 (e.g., the top search results), the index shard 408 does not have any more search results 24 in the collection of search results 16. If the last search result 24 received from the index shard 408 is included in the collection of search results 16 (e.g., the top search results) and the index shard 408 has the flag 30 indicating that the index shard 408 has no more search results 24 beyond the search results 24 already received, the index shard 408 does not have any more search results 24 and the collection of search results 16 is complete for that index shard 408. The search middle tier 406 repeats this analysis for all the search results 24 included in the collection of the search results 16 in determining whether the collection of search results 24 is complete. As such, the flags 28, 30 are used by the search middle tier 406 to determine whether additional search results 24 may be needed for the collection of search results 16.

If the verification indicates that the collection of search results 16 is complete, the search middle tier 406 returns the collection of search results 16 to the device 402 in response to the search request 12. In some implementations, the device 402 presents the collection of search results 16 on a display 404.

If the verification indicates that the collection of search results 16 may be incomplete (the index shard 408 has a flag 28 without a flag 30 indicating that there may be additional search results 24 from the index shard 408), the search middle tier 406 sends a second shard request 18 to the identified index shards 408 with a flag 28 without a flag 30. The search middle tier 406 uses the flag 28 without the flag 28 to identify one or more index shards 408 where search results 24 may be missing. The second shard request 18 is used to receive the remaining search results 24 from the identified index shards 408 since there still may be additional search results 24 from the identified index shards 408 that are higher ranked than the search results 24 currently included in the collection of search results 16.

In some implementations, the search middle tier 406 uses the position 32 of the identified index shards 408 in the collection of search results 16 and uses the position 32 to determine the size request 20 for the second shard request 18. For example, if the position 32 of the search result 24 is 4 that indicated additional search results 24 are still outstanding (e.g., the search result 24 is located as the fourth search result 24 in the ordered list), the search middle tier 406 identifies six additional search results (search results 5-10) as possibly missing. The search middle tier 406 sets the size request 20 to 6 and sends the second shard request 18 to the identified index shard 408 (e.g., the index shard 408 with the flag 28 without the flag 30) with the size request 20 of 6 to request an additional six search results 24 from the identified index shard 408. As such, the size request 20 for the second shard request 18 is less than the search size 14 but a different value from the size request 20 sent in the first shard request 18.

In some implementations, the size request 20 for the second shard request 18 is equal to the original search size 14. As such, the search middle tier 406 sends the second shard request 18 to the identified index shard 408 (e.g., the index shard 408 with the flag 28 without the flag 30) with the size request 20 equal to the original search size 14 to request additional search results 24 from the identified index shard 408 equal to the original search size 14.

The search middle tier 406 merges the received search results 24 from the second shard request 18 with the collection of search results 16. The received search results 24 include updated flags 28 and/or 30. If any of the search results 24 received in response to the second shard request 18 have a higher rank relative to the search results 24 included in the collection of search results 16, the search middle tier 406 updates the search results 24 in the collection of search results 16 with the higher ranked searched results 16. The search middle tier 406 returns the collection of search results 16 to the device 402 in response to the search request 12.

If any of the search results 24 in response to the second shard request 18 are lower in rank relative to the search results 24 included in the collection of search results 16, the search middle tier 406 ignores the lower ranked search results 16 and the search middle tier 406 returns the same collection of search results 16.

As such, the search middle tier 406 reduces the search results 24 processed from the plurality of index shards 408a-408s by requesting a number of search results 24 from each index shard 408 that is less than the original search size 14. Requesting a number of search results 24 that is less than the original search size 14 introduces a possibility that the search middle tier 406 makes a second shard request 18 if any search results 24 are missing from the collection of search results 24, and thus, slightly impacting the latency by requiring an additional shard request 18 for the missing search results 24. Even with the increase in latency with the additional round trip for the second shard request 18, the cost with respect to the search middle tier 406 and/or the total items processed (e.g., the search results 24), is still less than previous solutions.

In some implementations, the search middle tier 406 determines a probability threshold 22 that identifies the odds of needing a second shard request 18 to request additional search results 24. The probability threshold 22 provides a measure of the risk tolerance for higher latency for incomplete searches. The search middle tier 406 uses the probability threshold 22 to determine the size request 20, and thus, reducing the chance of needing any additional shard requests 18, and reducing the probability of an impact in the latency.

In some implementations, the search middle tier 406 targets a specified probability threshold 22 and uses the probability threshold 22 to identify for a given search request 12 with a search size 14 and an index shard count for the system, a minimal size request 20 that provides the probability threshold 22 or exceeds the probability threshold 22. The minimal size request 20 is a minimum number of search results 24 provided by each index shard 408 that reduces a probability of needing a second shard request 18 to achieve a complete search (e.g., the collection of search results 16 is not missing additional search results 24).

In some implementations, the search middle tier 406 uses different equations to determine the minimum number of search results 24 needed from each index shard 408 to reduce the probability of needing a second shard request 18.

One example equation used by the search middle tier 406 to determine the total ways the content can be distributed by the different index shards 408 is:

$$\text{Total Ways}(ApiPageSize, S) = S^{APiPageSize} \quad (1)$$

where ApiPageSize is the search size 14 for the search request 12, S is the number of index shards 408 in the distributed index whose content is uniformly hash distributed, and the TotalWays is the total ways the content can be distributed. The equation (1) assumes search results 24 in the ApiPageSize to be returned as a slot that can be filled by a search result 24 from an index shard 408 and assumes that each item is hash distributed amongst the index shards 408 independently and uniformly. For example, if the ApiPageSize (A) is 10 and there are 10 index shards, then the total number of ways the content can be distributed is $10^{10}$=10,000,000,000.

Another example equation used by the search middle tier 406 to determine the number of ways the search results 24 can be distributed among the different index shards 408 so that no single index shard contributes greater than or equal to the requested search results is:

$$\text{Ways At}(A, S, D) = \begin{cases} \sum_{k=1}^{L-1} \binom{\text{Min}(A, D)}{k} \text{Ways At}(A-k, S-1, D), & S > 2 \\ 0, & A \geq D, S = 1 \\ 1, & A < D, S = 1 \end{cases} \quad (2)$$

where A=ApiPageSize, D=DownstreamPageSize, and S=IndexShardCount. The equation (2) is used by the search middle tier 406 to find out the number of ways the content can be distributed among the different index shards 408 so that no single index shard contributes greater than or equal to the requested search results (e.g., the DownstreamPageSize (D)). The DownstreamPageSize (D) is used by the search middle tier 406 in determining the minimal amount of search results 24 to request from each index shard 408 and is used to identify the minimal size request 20. As such, the equation (2) allows for faster execution. The equation (2) builds up upon already computed of lower page sizes and/or lower request sizes, which can be iteratively used to fill a three-dimensional table, as needed.

Another example equation used by the search middle tier 406 to determine the probability that fewer than the DownstreamPageSize (D) results come from any single index shard 408 is:

$$P(\text{GoodDistribution}|\text{Query}) = P(A.S.D) = \text{WaysAt}(A.S.D)/\text{TotalWays}(A,S) \quad (3)$$

where P is the probability, A=ApiPageSize, D=DownstreamPageSize, and S=IndexShardCount. The search middle tier 406 uses the equation (3) to target a specific probability given a query and identify a probability threshold 22. In addition, the search middle tier 406 is able to use equation (3) given a search size 14 and index shard count, to find the lowest size request 20 (e.g., a minimum number of search results 24 to request from each index shard 408) that provides the target probability (e.g., the probability threshold 22) or better.

For example, if the probability threshold 22 is 99.999%, for 99.999% of the shard requests 18 with the minimal size request 20, a second shard request 18 is not required (e.g., the collection of search results 16 is complete). However, for 0.001% of the shard requests 18 with the minima size request 20, a second shard request 18 is required (e.g., the collection of search results 16 may not be complete). If there is a latency impact of a miss on the collection of search results 16, the latency impact only impacts 0.001% of traffic, whereas the savings is applicable to 99.999% of traffic.

The minimal size requests 20 provides a significant savings in the processing costs of the search requests 12 by requesting fewer search results 24 than the original search size 14 for the probability threshold 22, while only requiring an additional shard request 18 for a minimal amount of search requests 12. Thus, in some implementations the search middle tier 406 identifies an optimal size request 20 to request from each index shard 408 given the original search size 14, the number of index shards 408 involved, and the impact value.

One example use case includes a tenant with 512 index shards for Sharepoint content and an application programming interface (API) page size of 25 (e.g., the search size 14 of 25 search results). The search middle tier 406 determines the probability threshold 22 to be 99.999% and identifies the optimal size request 20 to be 5 search results. For example, the search middle tier 406 uses the equations (1), (2), and (3) to determine the optimal size request 20 for the search size 14 (e.g., 25 search results) and the index shard count (e.g., 512 index shards). Thus, for 99.999% of the search requests 12 received by the search middle tier 406, the collection of search results 16 is complete while requesting only 5 search results 24 from each index shard 408. The overall search result load is reduced by 80%, from 12,800 results (if 25 search results (the search size 14) are requested from each index shard 408) to 2,560 results by only requesting 5 search results 24 from each index shard 408. This is a significant decrease in a reduction in the search result load processed by the search middle tier 406.

Another example use case includes a tenant with 6,120 index shards and an API page size of 500. The search middle tier 406 determines the probability threshold 22 to be 99.999% and identifies the optimal size request 20 to be 6 search results. For example, the search middle tier 406 uses the equations (1), (2), and (3) to determine the optimal size request 20 for the search size 14 (e.g., 500 search results) and the index shard count (e.g., 6,120 index shards). Thus, for 99.999% of the search requests 12 received by the search middle tier 406, the collection of search results 16 is complete while requesting only 6 search results 24 from each index shard 408. The overall search result load is reduced by 99%, from 3,060,000 to 36,720 by only requesting 6 search results 24 from each index shard 408. The reduction in search result load significantly reduces the latency since latency is currently dominated by the overhead of processing such a massive number of search results at the search middle tier 406.

In some implementations, the search middle tier 406 accesses a table to look up the size request 20 values. The table is generated offline with different values for the size request 20 based on different sizes of requests and/or different index shard counts. By accessing a table with the size request 20 values, the search middle tier 406 does not need to re-compute the size request 20 values for every incoming request, but instead, looks up the size request 20 values from the table.

In some implementations, one or more computing devices are used to perform the processing of environment 400. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the search middle tier 406 and the index shards 408 are implemented wholly on the same computing device. Another example includes one or more subcomponents of the search middle tier 406 and/or the index shards 408 implemented across multiple computing devices. Moreover, in some implementations, the search middle tier 406 and/or the index shards 408 are implemented or processed on different server devices of the same or different cloud computing networks. Moreover, in some implementations, the features and functionalities are implemented or processed on different server devices of the same or different cloud computing networks.

In some implementations, each of the components of the environment 400 is in communication with each other using any suitable communication technologies. In addition, while the components of the environment 400 are shown to be separate, any of the components or subcomponents may be combined into fewer components, such as into a single component, or divided into more components as may serve a particular embodiment. In some implementations, the components of the environment 400 include hardware, software, or both. For example, the components of the environment 400 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 400 include hardware, such as a special purpose processing device to perform a certain function or group of functions. In some implementations, the components of the environment 400 include a combination of computer-executable instructions and hardware.

As such, the environment 400 significantly reduces the number of search results 24 needed to process in a search fanout, resulting in improved latencies and reduced costs for the distributed search engine.

Referring now to FIGS. 5A-5C, illustrated are example of search results 24 (FIG. 4) received by the search middle tier 406 (FIG. 4) from the index shards 408 (FIG. 4). The search results are represented as R{Sequence of Result from Shard},{Shard Number}, where the Sequence of Result from Shard indicates a placement (e.g., the position 32) of the search result in the ordered list and the Shard Number indicates the index shard (e.g., shard number 26) that provided the search result. For example, R1,8 is the first result in the search results from the 8$^{th}$ index shard.

Referring now to FIG. 5A, illustrated is an example search result list 500 received from index shard 1 in response to a shard request 18 with a size request 20 of 2 search results 24. The search result list 500 includes the two search results (e.g., search results 24) provided by index shard 1. In addition, the search result list 500 includes an identification 502 (e.g., flag 28) on the second search result 24 indicating that the search result is the last result received from index shard 1 but is not the last result that index shard 1 can serve. Since the second search result does not include another indication (e.g., flag 30) that this is the last result in the index shard 1, the search middle tier 406 identifies that there are additional search results 24 from the index shard 1 and that a second shard request 18 (FIG. 4) is required for the index shard 1.

Referring now to FIG. 5B, illustrated is an example search result list 504. The search result list 504 merges the different search results 24 received from the plurality of index shards 408*a-s* (FIG. 4) into a collection of search results 16 (FIG. 4). For example, the search result list 504 provides the top ten search results 24 received from the plurality of index shards 408*a-s*. The second search result received from index shard 1 in the 4$^{th}$ position includes an identification 506 (e.g., flag 28) indicating that the search result is the last search result 24 received from index shard 1 but is not the last search result 24 that index shard 1 can serve (e.g., flag 30 is missing from the second search result). As such, the search middle tier 406 identifies that there may be more search results from index shard 1 and that a second shard request 18 is needed for the index shard 1. The search middle tier 406 also knows that because no other results are marked, search results 24 have not been missed from any other index shards 408.

In this example, the search middle tier 406 sets the size request 20 for the second shard request 18 to 6 based on the position 32 (e.g., the 4$^{th}$ position) of the second search request with the identification 506. Theoretically, 6 more results (results 5-10) could come from index shard 1 and may rank higher than the search results past the 4$^{th}$ result. As such, the search middle tier 406 sends the second shard request 18 to the index shard 1 with a size request 20 of six search results.

Referring now to FIG. 5C, the search results list 508 illustrates the merged search results after receiving the additional six search results from the index shard 1 (e.g., an updated collection of search results 16). Since none of the search results are marked with identifiers in the search result list 508, the search middle tier 406 knows the top 10 results in the search result list 508 are correct and returns the search result list 508 to the application 10 (FIG. 4) that requested the search results.

Figure 6:
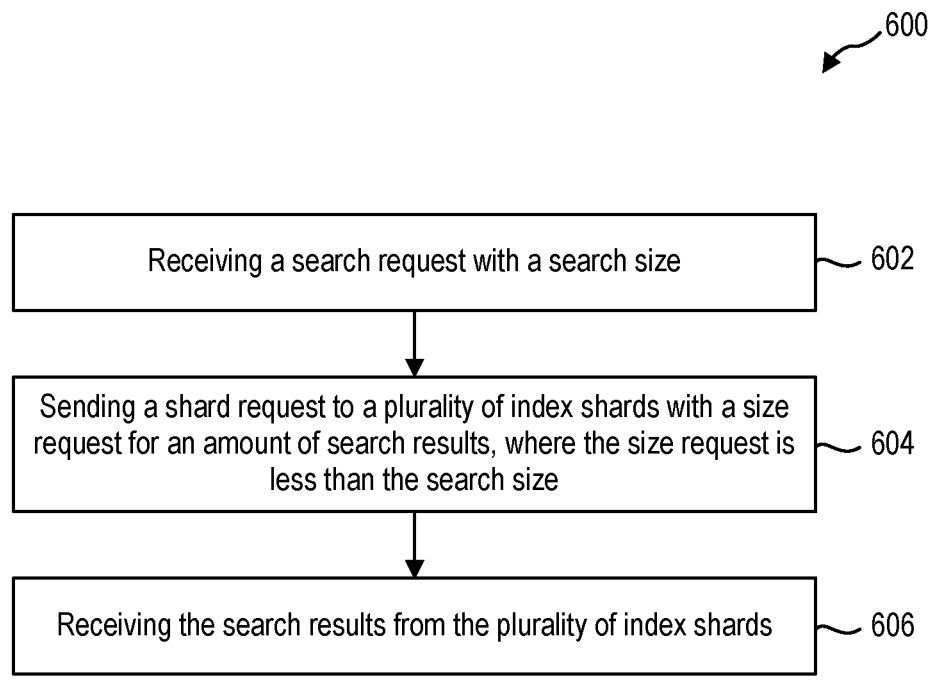
FIG. 6 illustrates an example method for performing a distributed search in accordance with implementations of the present disclosure.

Referring now to FIG. 6, illustrated is an example method 600 for performing a distributed search. The actions of the method 600 are discussed below with reference to the architecture of FIG. 4.

At 602, the method 600 includes receiving a search request with a search size. The search middle tier 406 receives the search request 12 for the search size 14. The search size 14 indicates an amount of search results to return. In some implementations, the search request 12 is received from an application 10. Example search requests 12 include, but are not limited to, searching e-mails, searching messages, searching files, and/or searching documents.

At 604, the method 600 includes sending a shard request to a plurality of index shards with a size request for an amount of search results, where the size request is less than the search size. The search middle tier 406 sends a shard request 18 to each index shard 408 of the plurality of index shards 408*a*-408*s* with a size request 20 for an amount of search results 24 from each index shard 408. The size request 20 is less than the search size 14. As such, the search middle tier 406 sends the shard request 18 to each index shard 408 requesting an amount of search results 24 equal to the size request 20 (which is less than the search size 14 originally requested in the search request 12).

At 606, the method 600 includes receiving the search results from the plurality of index shards. The search middle tier 406 receives the search results 24 from the plurality of index shards 408*a-s*. In some implementations, the search results 24 are unevenly distributed between the plurality of index shards 408*a-s*. In some implementations, the search results 24 are evenly distributed between the plurality of index shards 408*a-s*.

The search middle tier 406 merges the search results 24 into a collection of search results 16 equal to the search size 14. In some implementations, the search results 24 included in the collection of search results 16 are placed in a descending order based on a rank of the search results 24.

In some implementations, the search middle tier 406 performs a verification to ensure that the collection of search results 16 is correct. For example, the search middle tier 406 determines whether the collection of search results 16 is complete by identifying at least one index shard of the plurality of index shards 408*a-s* that includes a first flag 28 without a second flag 30. The first flag 28 indicates that the search result 24 is a last search result 24 received from the at least one index shard and the second flag 30 indicates that no more search results 24 are available from the at least one index shard.

The search middle tier 406 sends a second shard request 18 with a second size request 20 in response to determining that the collection of search results 16 is not complete. In some implementations, the search middle tier 406 sends the second shard request 18 to the at least one index shard with the second size request 20 equaling the search size 14 of the search request 12. The search middle tier 406 receives a second set of search results 24 in response to the second shard request 18. The search middle tier 406 merges the second set of search results 24 with the search results 24 into the collection of search results 16. The search middle tier 406 returns the collection of search results 16. For example, the search middle tier 406 returns the collection of search results 16 to the application 10 that sent the search request 12.

In some implementations, the search middle tier 406 sends the second shard request 18 to the at least one index shard with the second size request 20 that is less than the search size 14. In some implementations, the second size request 20 is determined based on a position 32 of the search results 24 of the at least one index shard.

The search middle tier 406 receives a second set of search results 24 in response to the second shard request 18. The search middle tier 406 merges the second set of search results 24 with the search results 24 into the collection of search results 16. The search middle tier 406 determines whether the collection of search results 16 is complete. The search middle tier 406 returns the collection of search results 16 in response to determining that the collection of search results 16 is complete. If the collection of search results 16 is not complete, the search middle tier 406 continues to send additional shard requests 18 until the returned search results 24 are complete.

The method 600 is used to reduced costs for the search middle tier 406 by reducing the number of search results processed in a search fanout, resulting in improved latencies and reduced costs for the search middle tier 406.

Figure 7:
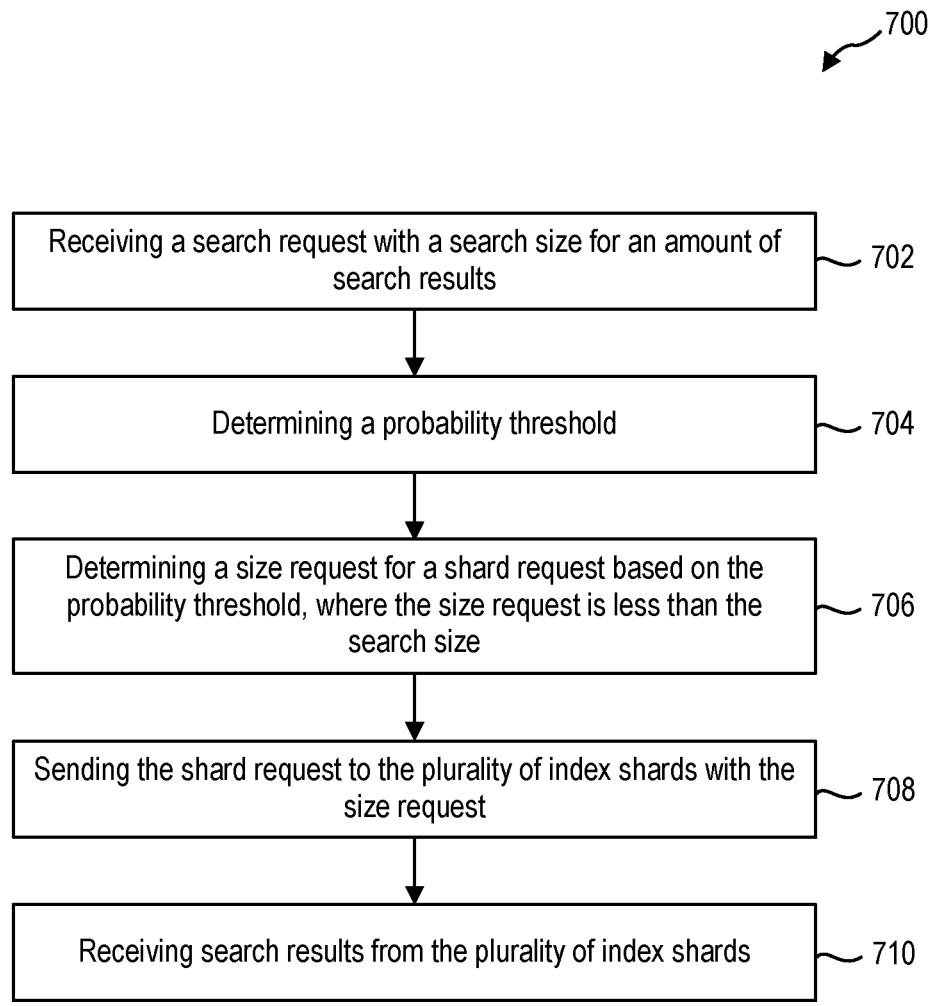
FIG. 7 illustrates an example method for determining a shard request size for performing a distributed search in accordance with implementations of the present disclosure.

FIG. 7 illustrates an example method 700 for determining a shard request size for performing a distributed search. The actions of the method 700 are discussed below with reference to the architecture of FIG. 4.

At 702, the method 700 includes receiving a search request with a search size for an amount of search results. The search middle tier 406 receives the search request 12 for the search size 14. The search size 14 indicates an amount of search results to return. In some implementations, the search request 12 is received from an application 10. In some implementations, the search size 14 is a default number that is the maximum search results 24 to return. In some implementations, the search size 14 changes for different search requests 12 and/or for different applications 10.

At 704, the method 700 includes determining a probability threshold. The search middle tier 406 determines a probability threshold 22 that identifies the odds of needing a second shard request 18 to request additional search results 24. The probability threshold 22 provides a measure of the risk tolerance for higher latency for incomplete searches. In some implementations, the probability threshold 22 is a target percentage of needing a second shard request 18 to request additional search results 24.

At 706, the method 700 includes determining a size request for a shard request based on the probability threshold, where the size request is less than the search size. The search middle tier 406 determines the size request 20 based on the probability threshold 22. The size request 20 is less than the search size 14. In some implementations, the size request 20 is a minimal number of search results 24 to request from each index shard 408 of the plurality of index shards 408a-s to meet or exceed the probability threshold 22. In some implementations, the search middle tier 406 determines the size request 20 based on a count of the plurality of index shards 408a-s and the search size 14.

In some implementations, the search middle tier 406 targets a specified probability threshold 22 and uses the probability threshold 22 to identify for a given search request 12 with a search size 14 and an index shard count for the system, a minimal size request 20 that provides the probability threshold 22 or exceeds the probability threshold 22. The minimal size request 20 is a minimum number of search results 24 provided by each index shard 408 that reduces a probability of needing a second shard request 18 to achieve a complete search (e.g., the collection of search results 16 is not missing additional search results 24).

At 708, the method 700 includes sending the shard request to the plurality of index shards with the size request. The search middle tier 406 sends a shard request 18 to each index shard 408 of the plurality of index shards 408a-408s with the size request 20 for an amount of search results 24 from each index shard 408. As such, the search middle tier 406 sends the shard request 18 to each index shard 408 requesting an amount of search results 24 equal to the size request 20 (which is less than the search size 14 originally requested in the search request 12).

At 710, the method 700 includes receiving search results from the plurality of index shards. The search middle tier 406 receives the search results 24 from the plurality of index shards 408a-s. The search results 24 are uniformly hash distributed among the plurality of index shards 408a-s. The number of search results 24 received from the plurality of index shards 408a-s does not exceed the size request 20.

The search middle tier 406 merges the search results 24 into a collection of search results 16 that is equal in size to the search size 14. The search middle tier 406 determines whether the collection of search results 16 is complete. The probability threshold 22 identifies a probability that the collection of search results is complete and a probability that the collection of search results 16 is incomplete.

The method 700 is used to identify a minimal size request 20 for the shard request 18 for achieving correct search results while minimizing a probability of needing a second shard request for additional search results. As such, the method 700 significantly reduces the search result load processed by the search middle tier 406 and significantly reduces the latency for the search requests 12.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a binary model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
receiving a search request with a search size;
sending a shard request to a plurality of index shards with a size request for an amount of search results, wherein the size request is less than the search size;
receiving the search results from the plurality of index shards;
using a plurality of flags in the search results to determine whether the search results from the plurality of index shards are complete;
sending a second shard request with a second size request in response to determining that the search results are not complete by identifying at least one index shard of the plurality of index shards that includes a first flag without a second flag, wherein a first flag of the plurality of flags indicates that the search result is a last search result received from an index shard and a second flag of the plurality of flags indicates that no more search results are available from the index shard; and
returning the search results in response to determining that the search results are complete.

2. The method of claim 1, further comprising:
merging the search results into a collection of search results, wherein the collection of search results is equal to the search size; and
returning the collection of search results.

3. The method of claim 2, wherein the search results included in the collection of search results are placed in a descending order based on a rank of the search results.

4. The method of claim 2, further comprising:
receiving a second set of search results in response to the second shard request.

5. The method of claim 4, further comprising:
merging the second set of search results with the search results into the collection of search results; and
returning the collection of search results.

6. The method of claim 4, wherein the second shard request is sent to the at least one index shard with the second size request equaling the search size of the search request, and the method further comprising:
merging the second set of search results with the search results into a collection of search results; and
returning the collection of search results.

7. The method of claim 4, wherein the second shard request is sent to the at least one index shard with the second size request, wherein the second size request is less than the search size, and the method further comprising:
merging the second set of search results with the search results into a collection of search results;
determining whether the collection of search results is complete;
returning the collection of search results in response to determining that the collection of search results is complete.

8. The method of claim 7, further comprising:
continuing to send additional shard requests until the returned search results are complete in response to determining that the collection of search results is not complete.

9. The method of claim 4, wherein the second size request is determined based on a position in the search results of the at least one index shard.

10. The method of claim 1, wherein the search results are evenly distributed between the plurality of index shards.

11. The method of claim 1, wherein the search results are unevenly distributed between the plurality of index shards.

12. A method, comprising:
receiving a search request with a search size for an amount of search results;
determining a probability threshold;
determining a size request for a shard request based on the probability threshold, wherein the size request is less than the search size;
sending the shard request to a plurality of index shards with the size request;
receiving search results from the plurality of index shards;
using a plurality of flags in the search results to determine whether the search results from the plurality of index shards are complete;
sending a second shard request with a second size request in response to determining that the search results are not complete by identifying at least one index shard of the plurality of index shards that includes a first flag without a second flag, wherein a first flag of the plurality of flags indicates that the search result is a last search result received from an index shard and a second flag of the plurality of flags indicates that no more search results are available from the index shard; and
returning the search results in response to determining that the search results are complete.

13. The method of claim 12, wherein the size request is a minimal number of search results to request from each index shard of the plurality of index shards to meet or exceed the probability threshold.

14. The method of claim 12, wherein determining the size request is based on a count of the plurality of index shards and the search size.

15. The method of claim 12, wherein the search results are uniformly hash distributed among the plurality of index shards.

16. The method of claim 12, further comprising:
merging the search results into a collection of search results, wherein the collection of search results is equal to the search size; and
determining whether the collection of search results is complete.

17. The method of claim 16, wherein the probability threshold identifies a probability that the collection of search results is complete.

18. The method of claim 16, wherein the probability threshold identifies a probability that the collection of search results is incomplete.

19. The method of claim 12, wherein the probability threshold is a target percentage of needing a second shard request to request additional search results.

* * * * *